United States Patent
Narasimhan et al.

(10) Patent No.: US 8,768,744 B2
(45) Date of Patent: Jul. 1, 2014

(54) METHOD AND APPARATUS FOR AUTOMATED USER REVIEW OF MEDIA CONTENT IN A MOBILE COMMUNICATION DEVICE

(75) Inventors: Nitya Narasimhan, Lake Zurich, IL (US); Rohit Chaudhri, Lake Zurich, IL (US); Michael D. Pearce, Barrington, IL (US)

(73) Assignee: Motorola Mobility LLC, Chicago, IL (US)

(*) Notice: Subject to any disclaimer, the term of this patent is extended or adjusted under 35 U.S.C. 154(b) by 1382 days.

(21) Appl. No.: 11/670,726

(22) Filed: Feb. 2, 2007

(65) Prior Publication Data

US 2008/0189354 A1   Aug. 7, 2008

(51) Int. Cl.
*G06Q 10/00* (2012.01)

(52) U.S. Cl.
USPC ..................................................... 705/7.29

(58) Field of Classification Search
USPC ........... 705/7.29, 14.44, 14.64; 715/738, 716, 715/745, 747, 752, 753, 764, 848; 725/45–47, 87, 93
See application file for complete search history.

(56) References Cited

U.S. PATENT DOCUMENTS

| | | | |
|---|---|---|---|
| 5,838,313 A | 11/1998 | Hou et al. | |
| 7,685,132 B2 * | 3/2010 | Hyman | 707/999.01 |
| 7,747,620 B2 * | 6/2010 | Beaupre | 707/734 |
| 7,818,350 B2 * | 10/2010 | New et al. | 707/803 |
| 7,937,380 B2 * | 5/2011 | Spiegelman et al. | 707/705 |
| 2002/0120925 A1 | 8/2002 | Logan | |
| 2003/0233422 A1 | 12/2003 | Csaszar et al. | |
| 2004/0122898 A1 | 6/2004 | Srinivasa | |
| 2005/0071865 A1 | 3/2005 | Martins | |
| 2005/0097451 A1 | 5/2005 | Cormack et al. | |
| 2005/0108233 A1 | 5/2005 | Metsatahti et al. | |
| 2005/0154746 A1 | 7/2005 | Liu et al. | |
| 2005/0165795 A1 | 7/2005 | Myka et al. | |
| 2005/0216457 A1 | 9/2005 | Walther et al. | |
| 2005/0234891 A1 | 10/2005 | Walther et al. | |
| 2005/0240596 A1 | 10/2005 | Worthen et al. | |
| 2007/0027707 A1 * | 2/2007 | Murray et al. | 705/1 |
| 2007/0058832 A1 * | 3/2007 | Hug et al. | 381/388 |
| 2007/0173236 A1 * | 7/2007 | Vishwanathan et al. | 455/414.1 |
| 2008/0071602 A1 * | 3/2008 | Ojakaar et al. | 705/10 |
| 2008/0172413 A1 * | 7/2008 | Chiu | 707/104.1 |

FOREIGN PATENT DOCUMENTS

| | | | | |
|---|---|---|---|---|
| JP | 2003345365 | * | 10/2003 | ............. G06F 17/60 |
| WO | 0016221 A1 | | 3/2000 | |
| WO | 2005045623 A2 | | 5/2005 | |

* cited by examiner

*Primary Examiner* — Mark A Fleischer

(57) ABSTRACT

A method and apparatus that creates reviews of media content on a mobile communication device is disclosed. The method may include identifying media content being played for a user, receiving a review from the user based on the played media content, and sending the user's review to a remote media content server for processing.

20 Claims, 4 Drawing Sheets

METHOD AND APPARATUS FOR AUTOMATED USER REVIEW OF MEDIA CONTENT IN A MOBILE COMMUNICATION DEVICE

BACKGROUND OF THE INVENTION

1. Field of the Invention

The invention relates to mobile communication devices, and in particular, to mobile communication devices that can play audio and/or video media content.

2. Introduction

Pull-based content consumption models such as iPod+ iTunes or iRadio+Cache&Carry are motivating a move away from traditional push-based radio broadcasting stations. These new models offer the user more control (over the content and its scheduling) and convenience (pause-resume, anytime-anywhere access to my content). However, they lack the unpredictability of traditional radio—in particular, they lack the existence of a moderator who can "introduce" users to new content or styles or can "revitalize" familiar but long-forgotten content by injecting new related content (e.g., trivia, artist interviews, artist-created introductions to the song, audio-clips from music authorities explaining nuances of the song that users were not aware of etc.).

More importantly, these new models isolate the user by eliminating the community aspects of traditional radio—in particular, they miss out on being able to "call-in" comments (opinions, recommendations, vocal appreciation or disgust for particular songs/artists etc.) on songs they hear. They also miss out on hearing other's comments, and on related conversations that may result.

SUMMARY OF THE INVENTION

A method and apparatus that creates reviews of media content on a mobile communication device is disclosed. The method may include identifying media content being played for a user, receiving a review from the user based on the played media content, and sending the user's review to a remote media content server for processing.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The invention comprises a variety of embodiments, such as a method and apparatus and other embodiments that relate to the basic concepts of the invention.

This invention concerns re-introducing some of these beneficial aspects of community-driven content to current content delivery and consumption models. In particular, the invention may concern a client-side mechanism to enable users to spontaneously create supplementary content such as user reviews and associate it with the original content in an effortless manner.

The invention may also concern a content server-side mechanism to enable this content to be scheduled on "suitable" user play lists against "appropriate" content. In particular, the focus is on the supplementary content that is created for (and consumed on) the same device/platform as the original content-essentially replicating the "inline" user conversation experience of traditional radio.

Figure 1:
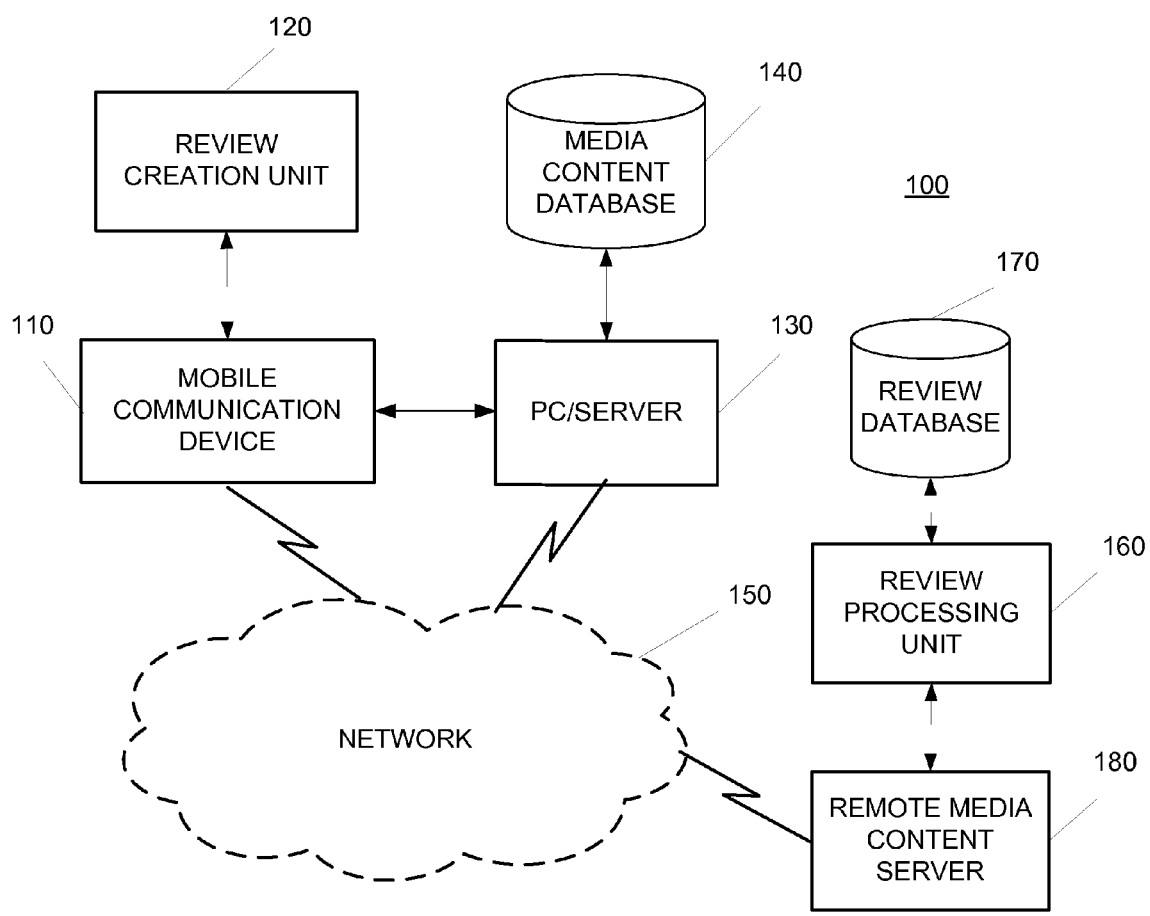
FIG. 1 illustrates an exemplary diagram of a possible network environment in accordance with a possible embodiment of the invention.

FIG. 1 illustrates an exemplary diagram of a network environment 100 in accordance with a possible embodiment of the invention. In particular, the network environment 100 may include mobile communication device 110, review creation unit 120, personal computer/server (PC/server) 130, media content database 140, network 150, review processing unit 160, remote media content server 180, and review database 170.

One of skill in the art will appreciate that the network environment 100 may be any possible configuration in which a mobile communication device 110 may be accessible to media content. As such, network 150 may represent any communication and/or media network, such as the Internet, intranet, telephone network, wireless network, cable television network, satellite television network, satellite radio network or any other network system capable of hosting domains containing media content that may be downloaded and/or played, for example.

The mobile communication device 110 may represent any device that plays stored or live media, such as a portable MP3 player, satellite radio receiver, AM/FM radio receiver, satellite television or set-top box, iPod, personal computer, laptop, potable computer, wireless radio, wireless telephone, digital video recorder, wireless communication device, cellular telephone, mobile telephone, personal digital assistant (PDA), etc., for example.

PC/server 130 represents any device, such as a server, a computer, MP3 player, cable or satellite television, set-top box, iPod, personal computer, laptop, potable computer, wired telephone, wireless telephone, digital video recorder, wireless communication device, cellular telephone, mobile telephone, personal digital assistant (PDA), etc., for example, that may receive and download media content, review requests, e-mail messages or electronic communications, etc. from the network 150, and transfer and receive files, data and other information from the mobile communication device 110. The PC/server 130 couples to the mobile communication device 110 by either hardwire or wireless manner, such that data, messages, media content, reviews, etc. may be exchanged.

The media content database 140 may represent any internal or external database, memory, storage device, etc., that may store media content such as audio, video, music, narration, etc., for example. Remote media content server 180 may represent any database, memory, storage device, server, computer, etc., that may store and transfer media such as audio, video, etc. over a network 150 to remote destinations, such as PC/server 130, mobile communication device 110 and media content database 140, for example.

Review database 170 stores reviews of media content from multiple users in a manner dictated by the review processing unit 160. A user's review may include a series of ratings, scores, narration, other data, etc. which may be freeform, or input into an electronic template. The review database 170 may include data in the form of attributes extracted from user reviews which may be categorized and organized according to artist, author, actor, title, genre, etc.

Figure 2:
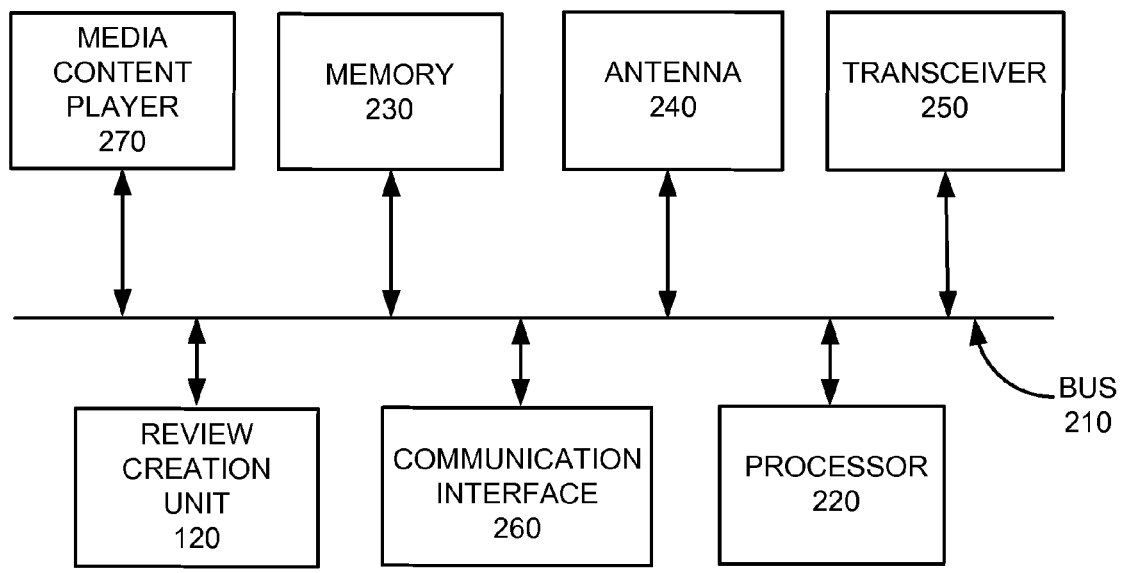
FIG. 2 illustrates a block diagram of an exemplary mobile communication device in accordance with a possible embodiment of the invention.

FIG. 2 illustrates a block diagram of an exemplary mobile communication device 110 having a review creation unit 120 in accordance with a possible embodiment of the invention. The exemplary mobile communication device 110 may include a bus 210, a processor 220, a memory 230, an antenna 240, a transceiver 250, a communication interface 260, a media content player 270, and a review creation unit 120. Bus 210 may permit communication among the components of the mobile communication device 110.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Transceiver 250 may include one or more transmitters and receivers. The transceiver 250 may include sufficient functionality to interface with any network or communication station and may be defined by hardware or software in any manner known to one of skill in the art. The processor 220 is cooperatively operable with the transceiver 250 to support operations within the communication network.

Communication interface 260 may include any mechanism that facilitates communication via the communication network. For example, communication interface 260 may include a modem. Alternatively, communication interface 260 may include other mechanisms for assisting the transceiver 250 in communicating with other devices and/or systems via wireless connections.

Media content player 270 may be any software or hardware, or a combination thereof, known to one of skill in the art that can play media content to a user of a mobile communication device 110, such as Real Player®, Windows Media Player®, Quick Time®, etc. run on processor 220, for example.

The mobile communication device 110 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 260.

The mobile communication device 110 illustrated in FIGS. 1 and 2 and the related discussion are intended to provide a brief, general description of a suitable communication and processing environment in which the invention may be implemented. Although not required, the invention will be described, at least in part, in the general context of computer-executable instructions, such as program modules, being executed by the mobile communication device 110, such as a communication server, or general purpose computer. Generally, program modules include routine programs, objects, components, data structures, etc. that perform particular tasks or implement particular abstract data types. Moreover, those skilled in the art will appreciate that other embodiments of the invention may be practiced in communication network environments with many types of communication equipment and computer system configurations, including cellular devices, mobile communication devices, personal computers, hand-held devices, multi-processor systems, microprocessor-based or programmable consumer electronics, and the like.

For illustrative purposes, the operation of the review creation unit 120 and review creation process will be described below in relation to the block diagrams shown in FIGS. 1 and 2.

Figure 3:
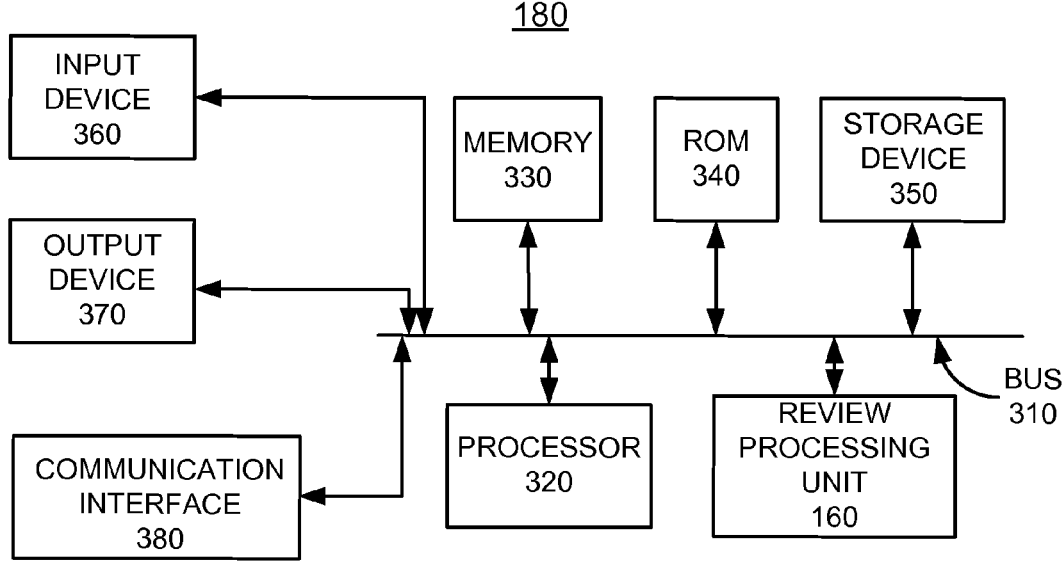
FIG. 3 illustrates a block diagram of an exemplary remote media content server in accordance with a possible embodiment of the invention.

FIG. 3 illustrates an exemplary diagram of a possible user remote media content server 180 shown in FIG. 1 which may implement one or more modules or functions of the review processing unit 160. Thus, exemplary remote media content server 180 may include a bus 310, a processor 320, a memory 330, a read only memory (ROM) 340, a storage device 350, an input device 360, an output device 370, a communication interface 380, and a review processing unit 160. Bus 310 may permit communication among the components of the remote media content server 180.

Processor 320, memory 330, and communication interface 380 function similarly to processor 220, memory 230, and communication interface 260 discussed above in relation to FIG. 2. Therefore, in the interest of brevity, one of skill in the art will require no further discussion.

ROM 340 may include a conventional ROM device or another type of static storage device that stores static information and instructions for processor 320. Storage device 350 may include any type of media, such as, for example, magnetic or optical recording media and its corresponding drive.

Input device 360 may include one or more conventional mechanisms that permit a user to input information to the user media player device 110, such as a keyboard, a mouse, a pen, a voice recognition device, touchpad, buttons, etc. Output device 370 may include one or more conventional mechanisms that output information to the user, including a display, a printer, one or more speakers, or a medium, such as a memory, or a magnetic or optical disk and a corresponding disk drive.

The remote media content server 180 may perform such functions for implementing the review processing process in response to processor 320 by executing sequences of instructions contained in a computer-readable medium, such as, for example, memory 330, a magnetic disk, or an optical disk. Such instructions may be read into memory 330 from another computer-readable medium, such as storage device 350, or from a separate device via communication interface 380.

Figure 4:
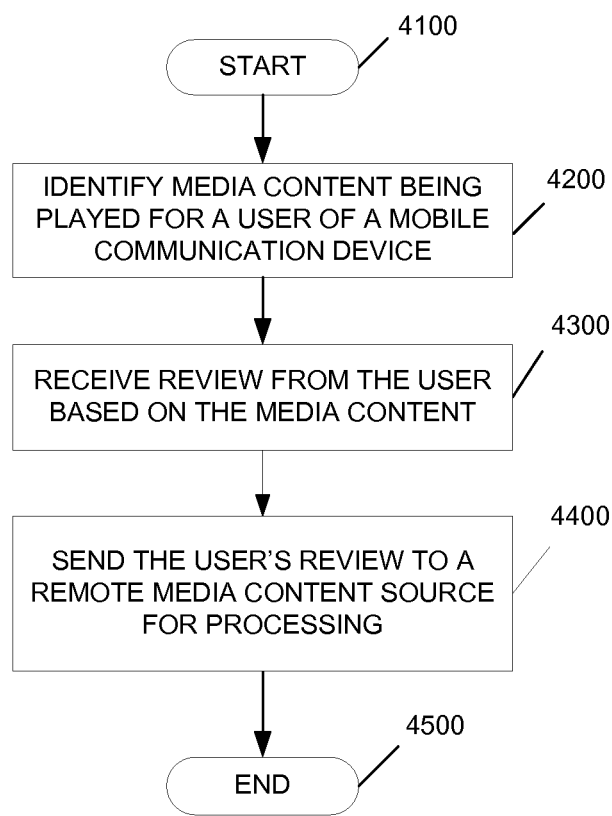
FIG. 4 is an exemplary flowchart illustrating one possible review creation process in accordance with one possible embodiment of the invention.

FIG. 4 is an exemplary flowchart illustrating some of the basic steps associated with a review creation process in accordance with a possible embodiment of the invention. The process begins at step 4100 and continues to step 4200 where the review creation unit 120 identifies media content being played for a user of the mobile communication device 110. The media content may be played live over the radio, for example, or from content stored in memory 230 on mobile communication device 110 or on the media content database 140.

At step 4300, the review creation unit 120 receives a review from the user based on the played media content. Ideally, but not necessarily, the review is created using the same modality as the played content. For example, the user creates an audio review for audio content and a video review for video content. As a result, the created review is in a format that enables it to be consumed readily on the same devices on which the related content is normally consumed. The user may create the review on his or her initiative. Alternatively, the user may be prompted by the mobile communication device 110 to submit a media content review. In this manner, the user may be prompted to review media content according to a schedule, according to the number of times the content has been played, because it is new content, etc. This prompt may be initiated at the mobile communication device 110 or remotely by review processing unit 160 through remote media content server 180.

At step 4400, the review creation unit 120 sends the user's review to the PC/server 130 so that it may be forwarded to the review processing unit 160 through the remote media content server 180. Alternatively, the review creation unit 120 may forward the review directly to either the remote media content server 180 or the review processing unit 160 through the mobile communication device 110. The process then goes to step 4500, and ends.

Figure 5:
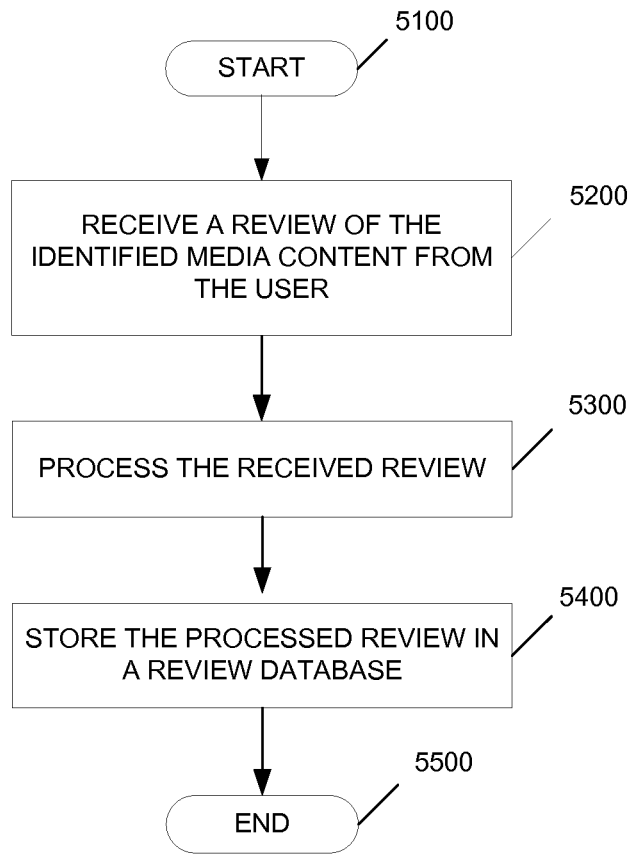
FIG. 5 is an exemplary flowchart illustrating one possible review processing process in accordance with one possible embodiment of the invention.

FIG. 5 is an exemplary flowchart illustrating some of the basic steps associated with a review processing process in accordance with a possible embodiment of the invention. The process begins at step 5100 and continues to step 5200, where the review processing unit 160 receives a review of the requested media content from the user. At step 5300, the review processing unit 160 processes the received review. The review processing process may include for example a filtering process for clarity and content, tagging the review according to necessary attributes, tallying any scores or ratings and noting those scores or ratings against the artist, actor, recording, movie, show, etc., scrubbing the review to identify and correct improper language, spelling, etc., or the like.

At step 5400, the review processing unit 160 stores the processed review in the review database 170. The review processing unit 160 may store the process to review in several manners, including according to artists, actors, genre, title, length, user identity, format etc. This enables the user reviews to be queried and matched against related played content (e.g., same song, or same artist, or same genre) or against review-specific attributes (user identity, duration, clarity) in order to facilitate future scheduling of the review against such related content. The process then goes to step 5500 and ends.

One may also appreciate that the remote media content server 180 may push content to users along with a request for a user review in order to evaluate the media content.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the review creation unit in FIGS. 1-2 each processing the content in various possible ways. It does not necessarily need to be one system used by all end users. Accordingly, the appended claims and their legal equivalents should only define the invention, rather than any specific examples given.

We claim:

1. A method for creating reviews of media content on a mobile communication device, comprising:
    identifying media content being played for a user on the mobile communication device, wherein the media content can originate from a radio broadcast, the mobile communication device, or remote media content server;
    initiating at the mobile communication device a review creation process for the identified media content;
    providing a mechanism to the user to create a review that such that the review received is using a same modality as associated with the identified media content;
    receiving the review from the user based on the played media content through the review creation process, wherein the review received from the user is in a the same format as that of the played media content; and
    sending the user's review to a remote media content server for processing, wherein the processing stores the user's review according to the format of the review such that the user's review is schedulable against related media content of the same format based on a query for reviews associated with the format and the user's review is consumable using the same modality as the related media content.

2. The method of claim 1, further comprising:
prompting the user to review the played media content through the review creation process.

3. The method of claim 2, further comprising:
receiving a request from the remote media content server to prompt the user to review the played media content.

4. The method of claim 2, wherein the user is prompted to review the media content after a predetermined number of times the played media content has been played.

5. The method of claim 1, wherein the mobile communication device is synched with a personal computer which forwards the user's review of the played media content to the remote media content server.

6. The method of claim 1, wherein the user's reviews include at least one of ratings and scores based on the played media content.

7. The method of claim 1, wherein the mobile communication device is one of a portable MP3 player, a satellite radio receiver, an AM/FM radio receiver, a satellite television, an iPod, a personal computer, a laptop, a potable computer, a wireless radio, a wireless telephone, a digital video recorder, a wireless communication device, a cellular telephone, a mobile telephone, and a personal digital assistant (PDA).

8. A mobile communication device, comprising:
a media content player that plays media content to a user; and
a review creation unit having a processor in communication with a storage medium, the processor executing machine readable instructions for performing the method of:
identifying media content being played for a user on the media content player;
initiating at the mobile communication device a review creation process for the identified media content;
providing a mechanism to the user to create a review that such that the review received is using a same modality as associated with the identified media content;
receiving the review from the user based on the played media content through the review creation process, wherein the review received from the user is in a the same format as that of the played media content; and
sending the user's review to a remote media content server for processing, wherein the processing stores the user's review according to the format of the review such that the user's review is schedulable against related media content of the same format based on a query for reviews associated with the format and the user's review is consumable using the same modality as the related media content.

9. The mobile communication device of claim 8, wherein the review creation unit prompts the user to review the played media content.

10. The mobile communication device of claim 9, wherein the review creation unit receives a request from the remote media content server to prompt the user to review the played media content.

11. The mobile communication device of claim 9, wherein the review creation unit prompts the user to review the played media content after a predetermined number of times the media content has been played.

12. The mobile communication device of claim 8, wherein the mobile communication device is synched with a personal computer which forwards the user's review of the played media content to the remote media content server.

13. The mobile communication device of claim 8, wherein the user's reviews include at least one of ratings and scores based on the played media content.

14. The mobile communication device of claim 8, wherein the mobile communication device is one of a portable MP3 player, a satellite radio receiver, an AM/FM radio receiver, a satellite television, an iPod, a personal computer, a laptop, a potable computer, a wireless radio, a wireless telephone, a digital video recorder, a wireless communication device, a cellular telephone, a mobile telephone, and a personal digital assistant (PDA).

15. A method of processing user reviews of media content sent from mobile communication devices, comprising:
identifying media content sent to a user at a mobile communication device;
receiving at a remote media content server computer a review of the media content from the user, wherein the review is created via a mechanism provided to the user such that the review received is created using a same modality as associated with the identified media content;
processing at the remote media content server computer the received review to extract an attribute of a format of the received review, the format based on the modality used to create the received review; and
storing in a review database the processed review, wherein the processed review is stored according to the attribute of the format of the review such that the processed review is schedulable against related media content of the same format based on a query for reviews associated with the format and the processed review is consumable using the same modality as the related media content.

16. The method of claim 15, further comprising:
extracting at the remote media content server computer attributes from the received review; and
storing in the review database the extracted attributes.

17. The method of claim 16, wherein the extracted attributes are at least one of actor, artist, author, title, ratings, scores, duration, user identity and genre.

18. The method of claim 15, further comprising:
scrubbing at the remote media content server computer the received review by at least one of correcting spelling and correcting language.

19. The method of claim 15, wherein the received reviews-review includes at least one of ratings and scores based on the played media content; and
recording in the review database the at least one of ratings and scores.

20. The method of claim 15, further comprising:
sending through the remote media content server computer a prompt to the mobile communication device for the user to review media content.

* * * * *